United States Patent [19]

McDaniel

[11] Patent Number: 4,747,298
[45] Date of Patent: May 31, 1988

[54] CONTAINER LEAK DETECTOR

[76] Inventor: Patrick K. McDaniel, 618 The Parkway, Richland, Wash. 99352

[21] Appl. No.: 938,027

[22] Filed: Dec. 4, 1986

[51] Int. Cl.$^4$ .............................................. G01M 3/32
[52] U.S. Cl. .......................................... 73/49.3; 73/52
[58] Field of Search .................. 73/49.2, 49.3, 52, 40, 73/45.4, 37, 40.7, 49.1, 49.8

[56] References Cited

U.S. PATENT DOCUMENTS

| | | | |
|---|---|---|---|
| 1,825,744 | 10/1931 | Landrum | 73/52 |
| 2,093,429 | 11/1937 | Foss | 73/52 |
| 2,339,639 | 1/1944 | Henszey | 73/52 |
| 2,527,560 | 10/1950 | Maher | 73/49.2 |
| 3,930,401 | 1/1976 | Filler | 73/49.2 |
| 3,985,018 | 10/1976 | Fox | 73/52 |
| 3,991,622 | 11/1976 | Oowada | 73/49.3 |
| 4,117,718 | 10/1978 | Hayward | 73/52 |

FOREIGN PATENT DOCUMENTS 1209569  3/1960  France ................. 73/49.3
44637    3/1984  Japan .................. 73/49.3

Primary Examiner—Michael J. Tokar
Assistant Examiner—Hezron E. Williams
Attorney, Agent, or Firm—Wells, St. John & Roberts

[57] ABSTRACT

Container testing apparatuses and methods for detecting leaks in containers such as at the rims of the container. Preferred apparatus have opposing testing heads with receptacles for receiving ends of a container. Each testing head has two seals. A first or end seal is preferably adapted to seal at the end wall of the container. The second or perimetric seal is expandable against the sidewall of the container. The perimetric seal has an internal expansion chamber which is pressurized to expand the seal into sealing engagement with the container. A differentially pressurized testing fluid is transmitting to a chamber formed between the seals and the container. A detector selectively senses changes in the container associated with the existence of a leak through which the differential pressure of the testing fluid is communicated.

63 Claims, 4 Drawing Sheets

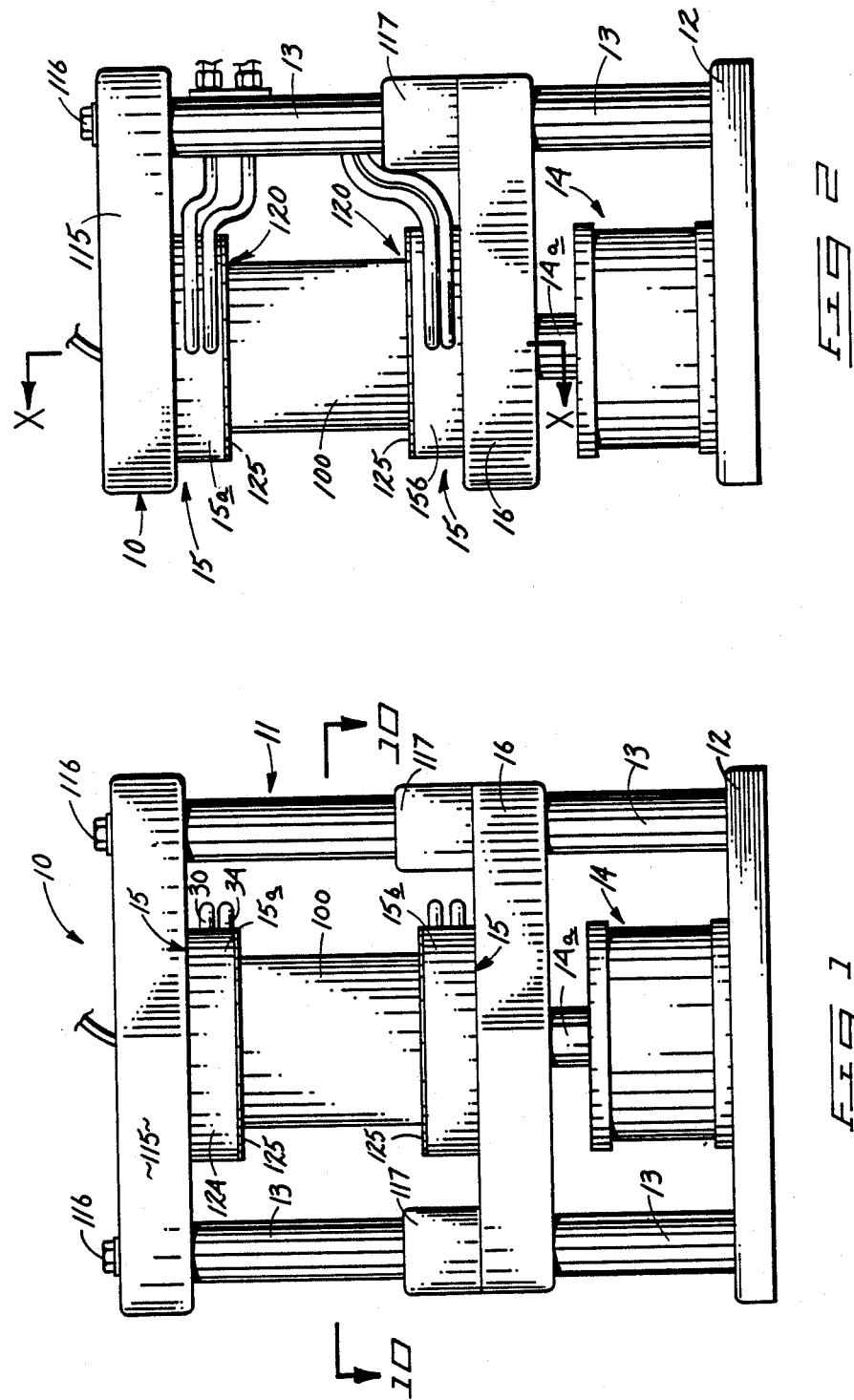

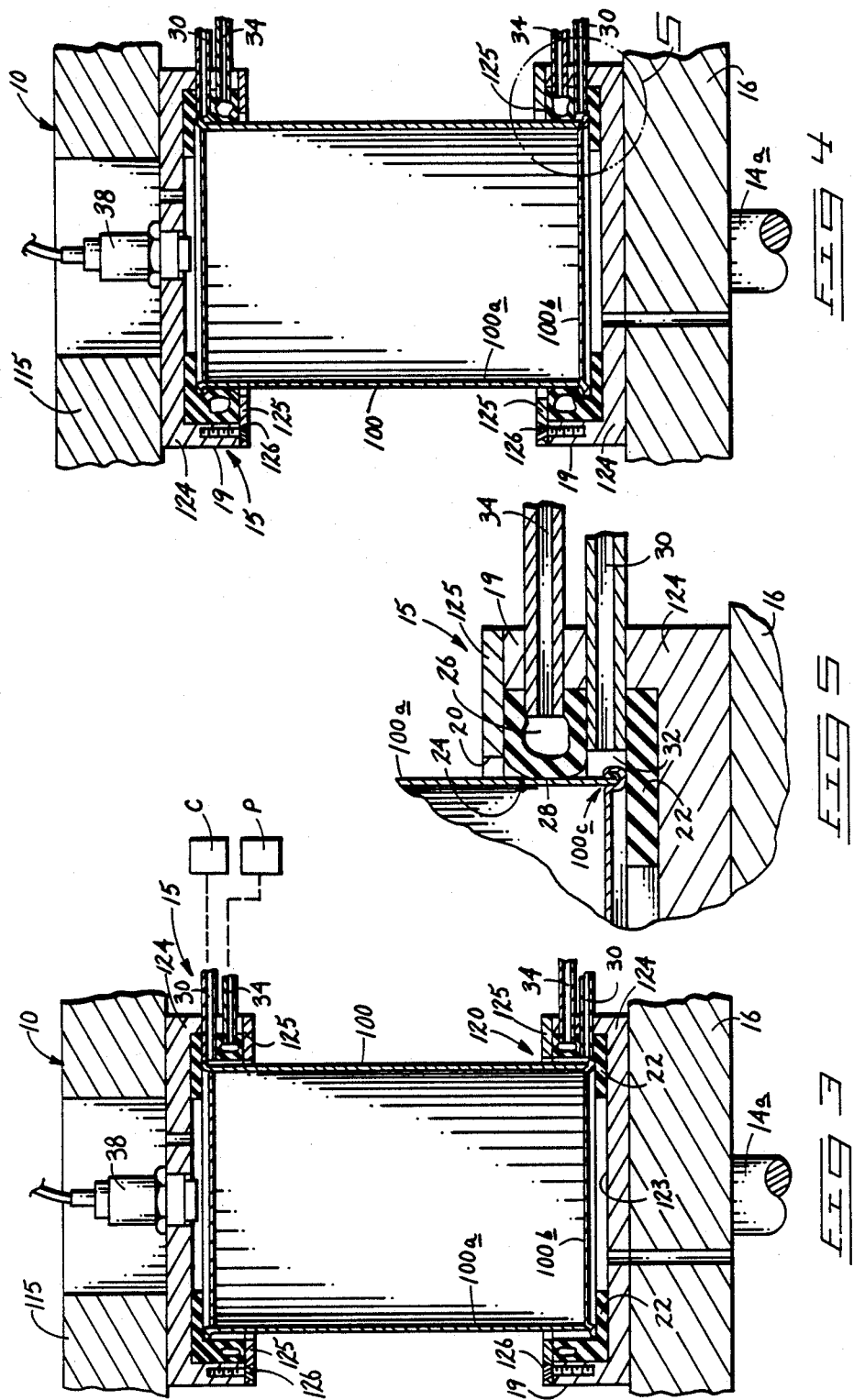

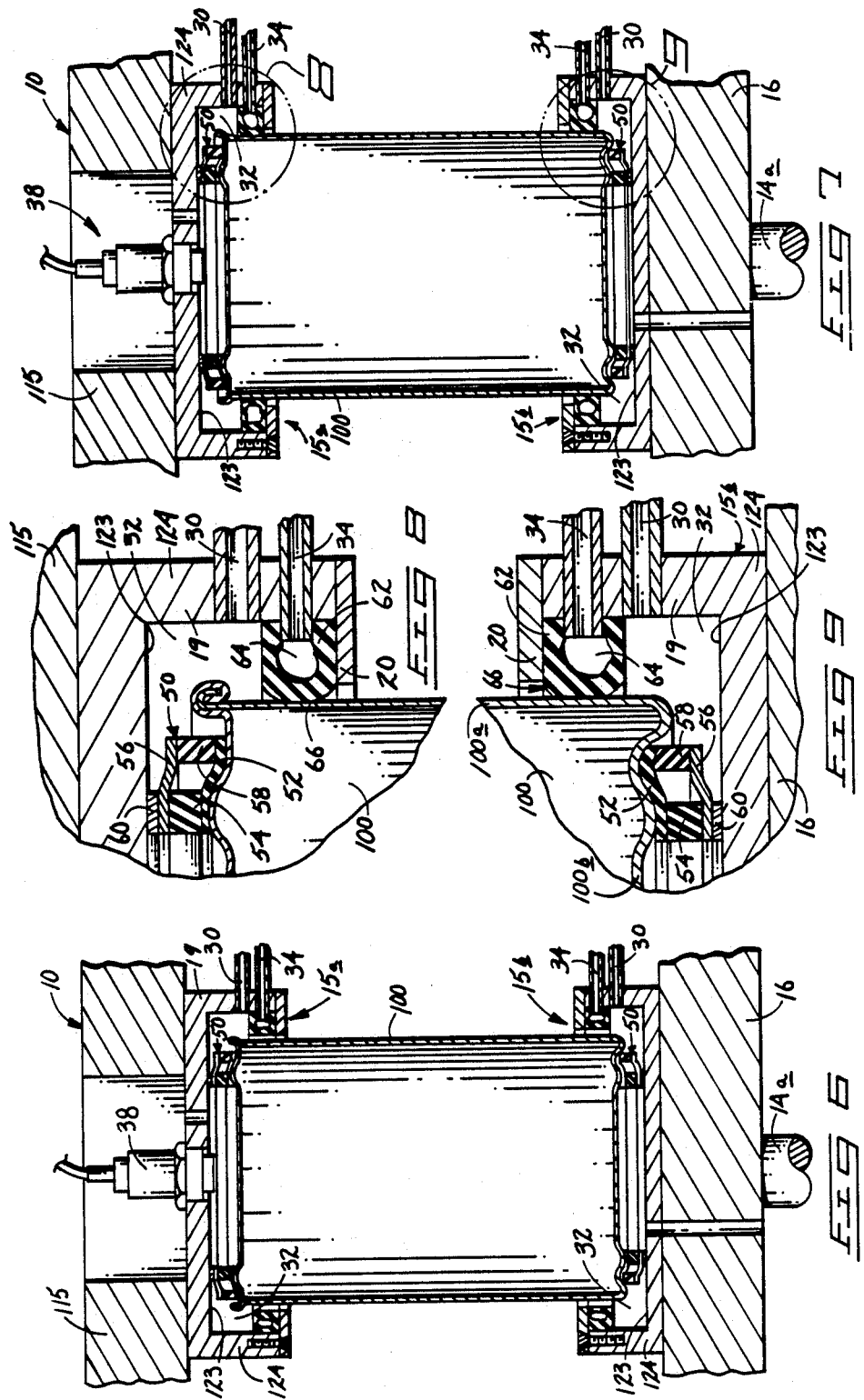

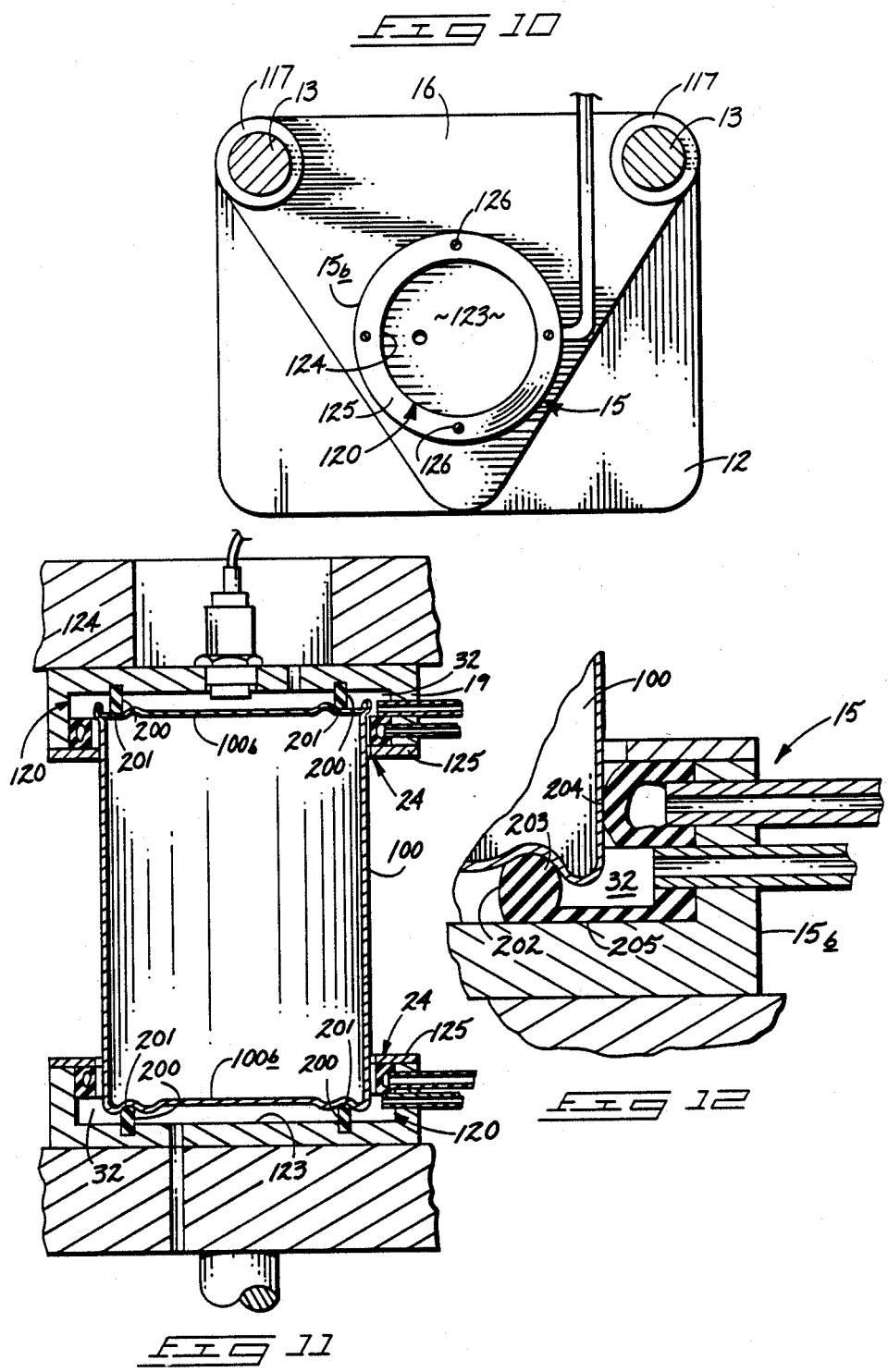

CONTAINER LEAK DETECTOR

TECHNICAL FIELD

This invention relates to methods and apparatuses for detecting leaks in containers.

BACKGROUND OF THE INVENTION

In the packaging industry, particularly in food processing, it is common to package perishables in metal containers. The contents are typically inserted through an open end of the container which is subsequently sealed. In order to prevent contamination and subsequent spoiling of perishables packed in such containers, it is essential that the seam used to seal the container is airtight.

During packaging a small pecentage of containers develop leaks or othewise are not sealed with an airtight seal. It is particularly important in the food packaging industry to detect such defectively sealed containers before the containers are shipped to retail outlets and subsequently purchased by a consumer. It is also important to detect unsealed containers early in the processing or packaging cycle to minimize the cost associated with further processing and handling such containers.

Product quality control considerations often require testing of every container after it has been sealed. Because of this, it is not possible to destructively test the containers and a reliable non-destructive testing system must be used.

Container leak testing apparatus used to test each container should be capable of fast operation in order to handle the high throughput of many high speed packaging and container sealing processes. It is further desirable to have a container testing system which can be integrated into such high speed processing lines and used to provide reliable proof testing of the containers for leaks.

There have been numerous prior art attempts to develop reliable high speed, non-destructive container seal testing equipment. One such prior art attempt is shown in U.S. Pat. No. 1,825,744 to Landrum. The Landrum patent discloses a method for detecting leaks in sealed containers by forming a seal over the peripheral edge of the closure between an end wall and a side wall of the container. The area between the seal and the end wall of the container is then evacuated. If the container leaks, the applied vacuum causes the closed end to bulge or pop outwardly producing an audible sound. The Landrum method and apparatus are only usable with containers sealed with an internal vacuum. The Landrum system requires an operator to hear or feel the pop of a defective container when a vacuum is applied. In most packaging plants the environment is extemely noisy and any such sound cannot be reliably heard by an operator. In addition, many food processing system handle 700 cans per minute. With such a rate of processing it is impossible for a human operator to accurately detect defective containers.

Another prior art method and apparatus are disclosed in U.S. Pat. No. 2,093,429 to Foss. The Foss patent discloses a machine for testing cans which are sealed with an internal vacuum. The Foss machine evacuates the atmospheric pressure from the outside face of one end of the can. If there has been a loss of vacuum in the interior of a can, the end will flex outwardly, coming into contact with two electrical contacts which provide an electrical indication that the can has lost its internal vacuum. The Foss apparatus is usable only with cans which are sealed with an internal vacuum.

A third prior art testing apparatus is disclosed in U.S. Pat. No. 2,339,639 to Henszey. The Henszey patent discloses an apparatus for testing a specific type of can having a small opening in the center of one end of the can. The can is filled through the small opening and the opening is sealed by a drop of hot molten metal. The Henszey apparatus forms an annular seal around the small sealed opening and applies air pressure to the sealed opening. If there is a leak through the seal, the can will bulge and the apparatus will detect the bulging.

BRIEF DESCRIPTION OF THE DRAWINGS

Preferred embodiment container leak detectors according to this invention are illustrated in the accompanying drawings, in which:

FIG. 1 is a front elvational view of a container testing apparatus with a container positioned therein;

FIG. 2 is a side elevational view of the container testing apparatus of FIG. 1;

FIG. 3 is a longitudinal sectional view taken along plane X—X of FIG. 2; the perimetric seal is shown in an unpressurized or contracted position;

FIG. 4 is a longitudinal sectional view similar to FIG. 3, with the perimetric seal expanded into a sealing position;

FIG. 5 is an enlarged sectional view of the circled area indicated with the large numeral 5 shown in FIG. 4;

FIG. 6 is a longitudinal sectional view of a container testing apparatus according to this invention fitted with alternative embodiment seals; the perimetric seal is shown in an unpressurized or contracted position;

FIG. 7 is a longitudinal sectional view similar to FIG. 6; with the perimetric seal in an unpressurized or contracted position;

FIG. 8 is an enlarged sectional view of the circled area indicated with the large numeral 8 shown in FIG. 7;

FIG. 9 is an enlarged sectional view of the circled area indicated with the large numeral 9 in FIG. 7;

FIG. 10 is a cross-sectional view taken along line 10—10 of FIG. 1, with the container removed;

FIG. 11 is a longitudinal sectional view of a container testing apparatus according to this invention fitted with alternative embodiment seals; and FIG. 12 is an enlarged sectional view of a portion of a container testing apparatus according to this invention fitted with other alternative embodiment seals.

DETAILED DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

The instant invention arose out of the need for a high speed, reliable, non-destructive testing method and apparatus for testing the seams of containers. One desirable feature of the present testing apparatus is that they can be easily integrated into a packaging assembly line, such as a food processing line in a cannery operation. It is also significant that testing apparatuses shown herein are capable of simultaneously testing seals formed at both ends of a typical cylindrical container, near the rims typically formed at the connection between the ends and sidewalls of the container.

A preferred container testing apparatus 10 is shown in FIGS. 1 and 2. Container testing apparatus 10 includes a support framework 11. Framework 11 includes a base plate 12 which is adapted for resting upon a supporting surface (not shown). Base plate 12 can alternatively be adapted for mounting to related machinery or other supporting structures such as by providing apertures therethrough the receiving bolts (not shown).

Framework 11 also includes a pair of upstanding stationary guide rods 13 which are rigidly connected to base plate 12 such as by welding or with fasteners (not shown). Guide rods 13 extend upwardly to a frame headpiece 115 which is detachably connected thereto using bolts 116.

Guide rods 13, base plate 12 and headpiece 115 form a stationary framework for mounting one or more container engaging testing heads 15. An upper testing head 15a is rigidly mounted to headpiece 115. A lower testing head 15b is movably mounted using a guide plate 16. Guide plate 16 is slidably mounted for linear motion upon guide rods 13 using slide bearings 117, well known in the art. Slide bearings 117 are rigidly connected to guide plate 16 in order to maintain accurate linear travel of the guide plate and connected testing head 15b.

Testing apparatus 10 further includes a hydraulic or pneumatic ram 14 which is mounted to base plate 12. A piston rod 14a extends upwardly from remaining portions of ram 14, preferably in an orientation which is parallel to guide rods 13. Piston rod 14a is extendible to raise or extend guide plate 16 and testing head 15b. Piston rod 14a is also contractible to lower or retract the guide plate and testing head. Other alternative means for movably mounting one or more testing heads will be apparent to those of skill in the art.

Reference to FIGS. 2 and 10 indicates that testing heads 15a and 15b are advantageously mounted in an overhung or cantilever arrangement with respect to guide rods 13. This cantilever arrangement allows container 100 to be easily inserted laterally between the testing heads from either side and from the front. Framework headpiece 115 and guide plate 16 are advantageously shown in a triangular planar configuration, although other configurations are clearly possible.

Testing heads 15a and 15b are constructed similarly, each having a primary or testing head member 124. Testing heads 15a and 15b are mounted upon headpiece 115 and guide plate 16, respectively, in an opposed, facing arrangement to allow simultaneous reception of opposing ends of container 100. Testing heads 15 are preferably detachable using suitable fasteners (not shown).

Testing heads 15 are shown constructed to receive and test a cylindrical container and are accordingly circular in plan view (see FIG. 10). Other container shapes can also be tested with appropriately shaped testing heads adapted to receive and seal against such containers in a manner which will hereinafter be described.

Testing heads 15 each have an end receiving receptacle 120 adapted to receive the ends of container 100. Testing head members 124 include bottom walls 123 (FIG. 3) which define the bottoms of receptacles 120. Annular side sections 19 extend longitudinally from bottom walls 123 along a portion of the container sidewalls 100a.

Detachable retaining rings 125 are mounted upon annular side sections 19 using suitable fasteners 126. Retaining rings 125 serve to retain an expandable perimetric seal 24 in longitudinal position within testing heads 15 (see FIG. 5). The inside edges or lips 20 of retaining rings 125 are normally spaced from sidewalls 100a of container 100 to provide clearance for insertion of the container into receptacle 120.

Testing heads 15 include a first or end seal member 22 interposed between the bottom walls 123 and end surfaces 100b of container 100. First seal member 22 is advantageously a continuous circuitous annularly shaped resilient element effective at forming a fluid-tight seal between the container and the bottom wall 123 of testing head member 124. FIGS. 3–5 show that seal 22 is adapted to seal against a rim 100c formed at the end of container 100. First seal member 22 is used to create a first seal against container 100 which partially encloses a testing fluid chamber 32 and prevents pressurized testing fluid from bearing upon central portions of the container end walls 100b.

Testing heads 15 also include second or perimetric seal members 24 which are used to form a second or perimetric seal against sidewalls 100a or other surfaces of container 100. Perimetric seal 24 and end seal 22 seal against container 100 to form enclosed testing fluid chamber 32. Testing fluid chamber 32 can also be enclosed by portions of bottom walls 123 and side sections 19.

Perimetric seal member 24 is an expandable seal having an internal expansion chamber 26. Internal expansion chamber 26 is advantageously a conduit which preferably extends within sealing member 24 about the entire length or perimeter defined by the seal. This full length extension of expansion chamber 26 within seal 24 provides effective sealing at a sealing face 28 about the full perimeter of container sidewalls 100a, so that a differential pressure can be maintained in testing fluid chamber 32. The planar configuration of seal 24 is circuitous, continuous and circular to seal against the circular shape of container 100. The specific cross-sectional shape of seal 24 can vary to accommodate varying container shapes, sealing requirements and seal designs, as is well-known in the art.

Testing heads 15 are adapted to transmit a pressurization fluid to internal expansion chamber 26. FIG. 5 shows a tube or conduit 34 which extends through side section 19 of the testing head to communicate the pressurization fluid therethrough and into chamber 26. Other appropriate conduits or passageways (not shown) are also clearly possible.

Pressurization fluid is controllably supplied and released through tube 34 to expand and contract seal 24, as illustrated in FIGS. 3 and 5, respectively. Control of pressurization fluid can occur using well-known solenoid or other appropriately operated valves (not shown) as is well-known in the art. Any suitable means for pressurizing the pressurization fluid is possible such as by compressor or pump shown graphically in FIG. 3 at P. Air can advantageously be used as a pressurization fluid.

FIGS. 3–5 show that first and second seals 22 and 24 can advantageously be made in the form of an integrated L-shaped piece made from an elastomeric or other resilient material. Alternatively, the first and second seals can be made from separate pieces such as shown in FIGS. 6–9 and 11. The first and second seals can also be made integral in the form shown by FIG. 12.

Testing heads 15 are also provided with means graphically shown at C in FIG. 3 for transmitting a testing fluid to and from the testing fluid chamber 32. FIG. 3 shows a small tube or conduit 30 which extends through a port formed through side section 19 of testing head member 124. The application of appropriately pressurized testing fluid through tube 30 from means C is advantageously controlled using an appropriate conventional control valve (not shown). Other alternative means for applying and releasing a differentially pressurized testing fluid to chamber 32 will be obvious to those of skill in the art. Testing fluid can be supplied from a tank or from a compressor, vacuum pump, or other fluid supplies, well-known in the art.

FIG. 11 shows testing apparatus 10 fitted with an alternative form of end seal 200 within the upper and lower test heads 15a and 15b. The end seals 200 are formed of annular rings of resilient material mounted to the bottom test head walls 123. Surfaces 201 of the seals 200 resiliently engage the container along the top and bottom end surfaces of the containers inwardly adjacent the container rims.

FIG. 12 shows another form of end seal 202 in which an annular ring 203 is integral with a perimetric seal 204. The annular ring 203 may be substantially identical to the end seal 200 described above. The perimetric seal 204 may be substantially identical to the seal 24 also described. The seals 202 and 204 are shown connected integrally by a web 205 of material common to both seals. The annular seal chamber 32 is thus defined primarily by the seals 202, 204, the web 205, and the container surfaces situated between the two seals.

FIGS. 6-9 show testing apparatus 10 fitted with other alternative forms of perimetric and end seals within upper and lower testing heads 15a and 15b. Perimetric seal 62 includes an internal expansion chamber 64 and is constructed substantially as described above with respect to perimetric seal 24. Perimetric or second seal 62 has a contacting face 66 which is along the inside of the ring-shaped seal. Contacting face 66 engages and seals against sidewalls of container 100.

FIGS. 6-9 further show an alternative type of end seal or first seal 50 according to this invention. Refer to FIGS. 8 and 9 which show end seals 50 enlarged. Each end seal advantageously includes an annular connection ring 60 which is appropriately connected to the associated testing head member 124 at the bottom wall 123 thereof. Seal 50 further includes annular spring members 56 which are connected to the testing head members using connection rings 60. Seal 50 further includes first and second support rings 54 and 58 which are connected to spring 56 and also to a sealing member 52. Sealing member 52 serves to contact end surfaces of container 100 and seal thereagainst. Sealing member 52 and support rings 54 and 58 are preferably made from a flexible or resilient material such as an elastomer.

End seals 30 provide greater sealing capability where containers are provided with raised reinforcement ridges along an area inwardly adjacent to the container rims. Improved sealing occurs because of the seal's ability to conform to the ridges and provide effectively two concentric seals, one at ring 54 and the other at ring 58. This duplex sealing arrangement is enhanced by additional fluid pressure applied to spring member 56 when testing fluid chamber 32 is pressurized above ambient conditions. The fluid pressure experienced under spring member 56 (as shown in FIG. 8) is less than the testing fluid pressure in chamber 32 because of the pressure sealing occurring adjacent to ring 58. The structural arrangement of seals 50 thus provide testing fluid pressure reinforcement of the mechanical sealing force provided by ram 14, when elevated testing fluid pressures are used.

It is noteworthy that end seals 200, 202 and 50 are shown sealing against end surfaces of container 100 which are radially inward of the container rim (see FIG. 8). This should be compared to end seals 22 which seal against the rims of container 100. The specific type of container being inspected may require one type of end seal over the other. Other, alternative forms of end seals may also be apparent to those of skill in the art.

Testing head 15a is also advantageously adapted to mount a sensor or detector 38 for selectively sensing a change in the container which only occurs if there is a leak in the container surfaces adjacent to the testing fluid chambers 32. Testing apparatus 10 uses only a single detector 38 since a leak at either end of container 100 will cause a similar bulging of container 100 at both end walls 100b.

Detector 38 can alternatively be an electronic or optical position or motion detectors which are capable of selectively sensing a deformation or bulging of the container end wall. Other changes in the container may also have a detectable effect associated with the communication of the testing fluid pressure through a leak in the container. Other alternative types of detectors can accordingly be used to identify defective or leaking containers based upon such detectable effects.

The operation of testing apparatus 10 will now be explained with reference to the embodiment of FIGS. 1-5. A similar procedure will apply with regard to the alternative seal structures shown in FIGS. 6-9, 11 and 12.

Ram 14 is first retracted in order to separate the opposing testing heads 15 to provide sufficient distance therebetween to receive container 100. The container is loaded by placing the container between testing heads 15 with the container ends coaxially aligned with receptacles 120 of testing heads 15. Container 100 can be loaded either manually or by mechanized equipment.

Ram 14 is then actuated to extend rod 14a and clamp container 100 between upper and lower testing heads 15a and 15b. The clamping force provided by ram 14 also provides a sealing force which seals end seals 22 against the rims or other end surfaces of container 100.

Pressurization fluid is then supplied through conduit 34 to expand the perimetric seal 24 into sealing engagement with sidewalls of container 100. Sealing must be provided by perimetric seal 24 and end seal 22 so that a sealed testing fluid chamber 32 is formed adjacent the portions of container 100 which are to be tested for leakage. Such portions of the container subjected to the testing fluid define a testing zone on the exterior of the container.

Testing fluid chambers 32 are then supplied with a differentially pressurized testing fluid such as through tube 30. In most instances the testing fluid will be introduced at an elevated pressure in excess of atmospheric or other ambient pressure. However, in some instances it may be desirable to use reduced or negative gauge pressures and such is clearly contemplated in this invention. The testing fluids are advantageously air or nitrogen which are relatively cheap and easily available. In some circumstances it may also be desirable to use other types of testing fluids. For example, helium is a relatively small molecule and can more easily penetrate small leaks and fissures. Other specific types of liquid or gaseous fluids may have other advantages which suggest their use for particular types of containers or in specific testing circumstances.

The application of the differentially pressurized testing fluid to the container must produce a detectable effect which can be directly related to whether there is a leak in container 100 or not. When elevated testing fluid pressures are used, the testing fluid will pressurize the interior of container 100 when a leak exists. Increased pressure within the container is typically manifested by deflection of one or both end walls 100b of the container. Detector 38 senses the deflection and responds by producing an output signal. The signal from detector 38 can be analyzed and connected to a threshold sensing device which triggers an alarm or instructs automated processing equipment to divert the container into a reject conveyor system (not shown). Other types of acoustical, electrical or optical sensors can alternatively perform the same function based on a different mode of action for sensing a manifestation associated with a leak in the container being tested.

Container 100 is removed from testing apparatus 10 after the detection phase of testing, just described, has been completed. Ram 14 is contracted and the container is released for unloading the subsequent processing dependent upon whether the leak test has been passed or failed.

Novel methods according to this invention preferably involve positioning a container adjacent to the first and second sealing means so that the portion of the container to be tested is between the seals. The first or end seal is then engaged against the container to form a sufficiently effective fluid-tight seal. Sealing of the first seal is advantageously accomplished by forcing the end seal against end walls 100b of the container or vice versa.

Preferred methods further involve forming a second seal, preferably by expanding a perimetric seal inwardly to engage and seal against sidewall surfaces of the container. Expansion of the perimetric seal is advantageously accomplished by applying a pressurized sealing fluid to an internal expansion chamber within the perimetric seal. The perimetric seal expands outwardly and seals against the container.

The first and second seals must seal and enclose a testing fluid chamber so that the chamber is capable of sustaining an appropriate testing pressure for a desired testing period. The testing pressure and the testing period will depend upon the size and type of leaks being tested for and the testing fluid used. Also relevant to the pressure and time parameters are the tightness of the seals and mechanical properties of the testing equipment and the container being tested.

The method further involves selectively detecting a manifestation or effect directly associated with the existence of a leak. Detection can advantageously be based upon a bulging or mechanical deformation of the container associated with application of a differentially pressurized testing fluid.

Methods of this invention can further advantageously involve depressurizing the testing fluid chamber. The internal expansion chamber of the perimetric seal is also depressurized and retracted. The testing heads are then retracted or otherwise removed from the container and the container is unloaded from the testing apparatus. After unloading, the container is rejected due to a leak or continues onwardly for further appropriate processing.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A container testing apparatus for applying a differential pressure to a sealed container to aid in detecting leaks therein, comprising:
   a testing head adapted to surround a portion of the container;
   first sealing means operably connected to the testing head for engaging and sealing against surfaces of the container along a first seal;
   second sealing means operably connected to the testing head for sealing against surfaces of the container along a second seal; said second sealing means having an internal expansion chamber adapted for receiving a pressurized sealing fluid therein to expand the second sealing means into sealing engagement against surfaces of the container, and adapted for discharging sealing fluid therefrom to contract the second sealing means from sealing engagement with surfaces of the container;
   said first and second sealing means defining at least portions of a testing fluid chamber adapted to apply a differentially pressurized testing fluid to surfaces of the container when said first and second sealing means are in sealing engagement against the container;
   means for providing a desired differential pressure to the testing fluid chamber and against adjacent portions of the container which are being tested;
   means for transmitting pressurized sealing fluid to said internal expansion chamber;
   means for transmitting pressurized sealing fluid from said internal expansion chamber;
   frame means adapted for movably mounting the testing head for motion to and from engagement with the container; and
   means for moving the testing head to and from engagement with the container.

2. A container testing apparatus for applying a differential pressure to a sealed container to aid in detecting leaks therein, comprising:
   a testing head adapted to surround a portion of the container;
   first sealing means connected to the container for engaging and sealing against surfaces of the container along a first seal;
   second sealing means connected to the testing head for sealing against surfaces of the container along a second seal; said second sealing means having an internal expansion chamber adapted for receiving a pressurized sealing fluid therein to expand the second sealing means into sealing engagement against surfaces of the container, and adapted for discharging sealing fluid therefrom to contract the second sealing means from sealing engagement with surfaces of the container;

said first and second sealing means defining at least portions of a testing fluid chamber adapted to apply a differentially pressurized testing fluid to surfaces of the container when said first and second sealing means are in sealing engagement against the container;

means for providing a desired differential pressure to the testing fluid chamber and against adjacent portions of the container which are being tested;

means for transmitting pressurized sealing fluid to said internal expansion chamber;

means for transmitting pressurized sealing fluid from said internal expansion chamber; and the testing head being adapted to receive a detector means, and further comprising a detector means for detecting a change in a wall of the container resulting from application of differentially pressurized testing fluid to the container through a leak therein.

3. A container testing apparatus for applying a differential pressure to a sealed container to aid in detecting leaks therein, the container having end surfaces and at least one side wall connected to the end surfaces, the apparatus comprising:

first sealing means for engaging and sealing against one of the end surfaces of the container along a first seal;

second sealing means for sealing against surfaces of the container along a second seal;

said second sealing means having an nternal expansion chamber adapted for receiving a pressurized sealing fluid therein to expand the second sealing means into sealing engagement against a side wall surface of the container, and being adapted for discharging sealing fluid therefrom to contract the second sealing means from sealing engagement with surfaces of the container;

said first and second sealing means defining at least portions of a testing fluid chamber adapted to apply a differentially pressurized testing fluid to surfaces of the container when said first and second sealing means are in sealing engagement against the container;

the first and second sealing means being connected to a testing head member having a receptacle for receiving an end of the container therein; said second sealing means being mounted along side sections of the receptacle for engaging at least one side wall of the container and sealing there against;

said first sealing means being mounted along a bottom wall of the receptacle for engaging the one end surface of the container and sealing there against;

means for providing a desired differential pressure to the testing fluid chamber and against adjacent portions of the container which are being tested;

means for transmitting pressurized sealing fluid to said internal expansion chamber; and means for transmitting pressurized sealing from said internal expansion chamber.

4. A container testing apparatus for applying a differential pressure to a sealed container about annular portions to aid in detecting leaks therein, comprising:

first sealing means for engaging and sealing against surfaces of the container along a first annular seal at one of the ends of the container;

second sealing means for sealing against surfaces of the container along a second annular seal spaced from the first annular seal;

said first and second sealing means defining at least portions of an annular testing fluid chamber adapted to apply a differentially pressurized testing fluid about an annular portion of the container when said first and second sealing means are in sealing engagement against the container surfaces; and means for communicating a desired differential pressure to the testing fluid chamber and against the annular area of the container which is being tested.

5. The container testing apparatus of claim 4 wherein the second sealing means is formed adjacent the first sealing means.

6. The container testing apparatus of claim 4 wherein the first and second sealing means are positioned to leave a substantial portion of both ends of the container outside of the testing fluid chamber.

7. The container testing apparatus of claim 4 wherein the first and second sealing means are positioned to leave substantial portions of both the ends and side surfaces of the container outside of the testing fluid chamber.

8. The container testing apparatus of claim 4 adapted to test a container having an annular rim formed at the one end, the first and second sealing means sealing about the annular rim.

9. The container testing apparatus of claim 4 adapted to test a container having an annular rim formed at the one end, the annular rim projecting outwardly from the one end;

the first sealing means sealing against the annular rim; and the second sealing means sealing against side surfaces of the container which are adjacent the annular rim.

10. The container testing apparatus of claim 4 wherein the first and second sealing means are connected to a testing head member having a receptacle for receiving an end of the container therein; said second sealing means being mounted along side sections of the receptacle for engaging at least one sidewall of the container and sealing thereagainst; and said first sealing means being mounted along a bottom wall of the receptacle for engaging the one end surface of the container and sealing thereagainst.

11. The container testing apparatus of claim 4 further comprising detector means for selectively detecting an effect associated with application of the differentially pressurized testing fluid through a leak in the container.

12. A container testing apparatus for detecting leaks in a sealed container, comprising:

a frame;

at least one testing head mounted on the frame;

first sealing means connected to the testing head for engaging and sealing against surfaces of the container along a first seal;

second sealing means connected to the testing head for expandably sealing against surfaces of the container along a second seal spaced from said first seal; said second sealing means being elastic and having an internal expansion chamber adapted for controllably receiving a pressurized sealing fluid therein to controllably expand and contract the second sealing means; said second sealing means being expandable into expanded positions for sealing engagement against the surface of the container; said second sealing means being contractible into contracted positions wherein the second sealing means is contracted and spaced from the surface of the container;

the first and second sealing means defining at least portions of a testing fluid chamber about a portion of the container which is being tested for leakage;

means for transmitting differentially pressurized testing fluid to and from the testing fluid chamber;

means for transmitting sealing fluid to and from the internal expansion chamber of said second sealing means; and detector means for selectively detecting an effect directly associated with application of the differentially pressurized testing fluid through a leak in the container.

13. The container testing apparatus of claim 12, wherein the testing head is movably mounted on the frame for motion to and from engagement with the container.

14. The container testing apparatus of claim 12 defined to include a plurality of testing heads, each provided with: said first and second sealing means; said means for transmitting differentially pressurized testing fluid; and said means for transmitting sealing fluid.

15. The container testing apparatus of claim 14 wherein the testing heads have receptacles adapted to receive opposing ends of the container; and wherein at least one of said testing heads is movably mounted to the frame means for motion to and from engagement with the opposing ends of the container.

16. The container testing apparatus of claim 12 wherein the testing head has a receptacle adapted to receive an end of the container at least partially therein; said first sealing means being adapted to seal against end surfaces of the container, and said second sealing means being adapted to seal against at least one sidewall of the container.

17. The container testing apparatus of claim 16 wherein the second seal extends perimetrically about a container sidewall.

18. The container testing apparatus of claim 12 wherein the detector means senses a changed position of a surface of the container associated with application of the differentially pressurized testing fluid through a leak in the container.

19. A method for detecting leaks in a sealed container, comprising:

placing an end of the container within a receptacle;

forming a first seal within the receptacle against surfaces at one end of the container;

expandably forming a second seal within the receptacle against said surfaces of the container, said second seal being spaced from said first seal;

said first and second seals forming at least portions of an enclosed testing fluid chamber about a portion of the container being tested for leakage;

creating a desired pressure within the testing fluid chamber and against adjacent portions of the surfaces of the container which are being tested; and detecting an effect selectively associated with communication of differentially pressurized testing fluid through a leak in the container.

20. The method of claim 19 wherein at least one of the first or second seals is expandably formed.

21. The method of claim 19 wherein the first seal is formed on a rim forming a part of the one end surface of the container.

22. The method of claim 19 wherein the first seal is formed on the one end surface adjacent to a rim of the container.

23. A seal for a container testing apparatus which applies a differential pressure to a sealed container to aid in detecting leaks therein, the testing apparatus having a testing head member which includes a receptacle for receiving an end of the container therein, the seal comprising:

an integral, one piece, annular, cross-sectionally L-shaped member made of a resilient material, the L-shaped member being sized to fit at least partially within the testing head member receptacle;

one extension of the L-shaped member including first sealing means for engaging and sealing against surfaces of the container along a first annular seal at one of the ends of the container;

the other of the extensions of the L-shaped member including second sealing means for sealing against side surfaces of the container along a second annular seal; and said second sealing means having an internal expansion chamber adapted for receiving a pressurized sealing fluid therein to expand the second sealing means into sealing engagement against side surfaces of the container, and being adapted for discharging sealing fluid therefrom to contract the second sealing means from sealing engagement with surfaces of the container.

24. A container testing apparatus for applying a differential pressure to a sealed container to aid in detecting leaks therein, comprising:

first sealing means for engaging and sealing against surfaces of the container along a first annular seal at one of the ends of the container;

second sealing means for sealing against side surfaces of the container along a second annular seal adjacent the one end of the container; a substantial portion of the container side surfaces between the container ends being outside the second sealing means; said second sealing means having an internal expansion chamber adapted for receiving a pressurized sealing fluid therein to expand the second sealing means into sealing engagement against the side surfaces of the container, and being adapted for discharging sealing fluid therefrom to contract the second sealing means from sealing engagement with the side surfaces of the container;

said first and second sealing means defining at least portions of an enclosed testing fluid chamber adapted to apply a differentially pressurized testing fluid about an annular portion of the container when said first and second sealing means are in sealing engagement against the container, substantial portions of the end and side surfaces of the container being outside of the testing fluid chamber;

means for communicating a desired differential pressure to the testing fluid chamber and against adjacent portions of the container which are being tested;

means for transmitting pressurized sealing fluid to said internal expansion chamber; and means for transmitting pressurized sealing fluid from said internal expansion chamber.

25. The container testing apparatus of claim 24 wherein the first and second sealing means are connected to a testing head adapted to surround a portion of the container.

26. The container testing apparatus of claim 25 further comprising:
frame means adapted for movably mounting the testing head for motion to and from engagement with the container; and
means for moving the testing head to and from engagement with the container.

27. The container testing apparatus of claim 25 wherein the testing head is adapted to receive a detector means, and further comprising a detector means for detecting a change in the one end of the container resulting from application of differentially pressurized testing fluid to the container through a leak therein.

28. The container testing apparatus of claim 24 adapted to test a container having an annular rim connecting the one end and side surfaces adjacent the one end, the annular rim projecting outwardly from the one end;
the first sealing means sealing against the annular rim; and
the second sealing means sealing against the adjacent side surfaces of the container.

29. The container testing apparatus of claim 25 wherein there are a plurality of testing heads each having: said first and second sealing means; said means for providing a desired pressure; said means for transmitting pressurized sealing fluid to said internal expansion chamber; and said means for transmitting pressurized sealing fluid from said internal expansion chamber.

30. The container testing apparatus of claim 29 where there are two testing heads mounted on a frame; at least one of said testing heads being movably mounted on the frame for motion to and from the other testing head.

31. The container testing apparatus of claim 24 further comprising detector means for selectively detecting an effect associated with application of the differentially pressurized testing fluid through a leak in the container.

32. A container testing apparatus for applying a differential pressure to a sealed container about annular portions to aid in detecting leaks therein, comprising:
at least one testing head having a receptacle sized for receiving and surrounding an end of the container therein;
first sealing means within the receptacle for engaging and sealing against surfaces of the container along a first annular seal at one of the ends of the container;
second sealing means within the receptacle for sealing against surfaces of the container along a second annular seal spaced from the first annular seal;
said first and second sealing means defining at least portions of an annular testing fluid chamber adapted to apply a differentially pressurized testing fluid about an annular portion of the container when said first and second sealing means are in sealing engagement against the container; and
means for providing a desired differential pressure to the testing fluid chamber and against an annular portion of the container which is being tested.

33. The container testing apparatus of claim 32 further comprising:
frame means adapted for movably mounting the testing head for motion to and from engagement with the container; and
means for moving the testing head to and from engagement with the container.

34. The container testing apparatus of claim 32 wherein the testing head is adapted to receive a detector means, and further comprising a detector means for detecting a change in the one end of the container resulting from application of differentially pressurized testing fluid to the container through a leak therein.

35. The container testing apparatus of claim 32 adapted to test a container having an annular rim formed at the one end, the annular rim projecting outwardly from the one end;
the first sealing means sealing against the annular rim; and
the second sealing means sealing against side surfaces of the container which are adjacent the annular rim.

36. The container testing apparatus of claim 32 wherein there are a plurality of testing heads each having: said first and second sealing means; said means for providing a desired differential pressure within the testing fluid chamber.

37. The container testing apparatus of claim 32 further comprising detector means for selectively detecting an effect associated with application of the differentially pressurized testing fluid through a leak in the container.

38. The container testing apparatus of claim 32 adapted to test a container having an annular rim formed at the one end, the first and second sealing means sealing about the annular rim.

39. A method for detecting leaks within a testing zone covering limited surface portions of a sealed container, comprising:
forming a first continuous annular seal against surfaces of a container;
forming a second continuous annular seal against surfaces of the container, said second seal being spaced from the first annular seal and leaving a substantial portion of the container side surfaces between the container ends outside of the second annular seal;
said first and second continuous annular seals defining an enclosed testing zone when sealing engaged against the container, said first and second continuous annular seals forming at least portions of an enclosed testing fluid chamber about the testing zone;
creating a desired pressure within the testing fluid chamber and against testing zone portions of the container surface; and
detecting an effect selectively associated with communication of differentially pressurized testing fluid through a leak in the container.

40. The method of claim 39 wherein:
an end of the container is positioned within a receptacle and the first seal is formed within the recepatcle upon end surfaces of the container;
and the second seal is formed within the receptacle upon at least one sidewall of the container.

41. The method of claim 40 wherein the first seal is formed on a rim forming a part of the end surfaces of the container.

42. The method of claim 40 wherein the first seal is formed on an end wall adjacent to a rim of the container.

43. A container testing apparatus for applying a differential pressure to limited portions of a sealed container to aid in detecting leaks existing within said limited portions of the sealed container, comprising:

first sealing means for engaging and sealing against surfaces of the container along a first continuous seal;

second sealing means for engaging and sealing against surfaces of the container along a second continuous seal which is spaced from said first continuous seal;

said first and second continuous seals defining at least one testing zone covering limited surface portions of the container therebetween; said first and second continuous seals also defining at least portions of an enclosed testing fluid chamber adapted to apply a differentially pressurized testing fluid to surfaces of the container within the testing zone when said first and second sealing means are in sealing engagement against the container;

means for providing a desired differential pressure within the testing fluid chamber and against container surfaces within the testing zone;

a frame; and means for positioning the first and second sealing means at desired locations for sealing against the container along said first and second continuous seals, respectively.

44. The container testing apparatus of claim 53 wherein the first and second means are connected to a testing head adapted to surround a portion of the container.

45. The container testing apparatus of claim 43 wherein the first and second sealing means are connected to a testing head which surrounds an annular portion of the container.

46. The container testing apparatus of claim 43 wherein the first and second sealing means are connected to a testing head which receives an end portion of the container and surrounds an annular portion of the container.

47. The container testing apparatus of claim 43 wherein the first and second sealing means are connected to a testing head which receives an end portion of the container and surrounds an annular portion of the container including a container rim adjacent to said end portion of the container.

48. The container testing apparatus of claim 43 wherein the first and second sealing means define a testing zone on the container which includes a rim adjacent to an end surface of the container; the testing zone being limited so as to expose portions of said end surface of the container to ambient conditions outside of the testing fluid chamber.

49. The container testing apparatus of claim 48 further comprising detector means for detecting a change in a wall of the container resulting from application of differentially pressurized testing fluid to the container through a leak therein.

50. The container testing apparatus of claim 49 wherein the detector means is mounted on said testing head.

51. The container testing apparatus of claim 43 wherein the first and second sealing means are connected to a testing head which is movably mounted on said frame.

52. The container testing apparatus of claim 48 wherein the testing head is movably mounted for motion to and from engagement with the container.

53. The container testing apparatus of claim 43 wherein the testing head is stationarily mounted to the frame.

54. The container testing apparatus of claim 43 wherein there are a plurality of testing heads connected to said frame, a plurality of the testing heads including first and second sealing means for defining testing fluid chamber and testing zones.

55. The container testing apparatus of claim 54 wherein at least one of said testing heads is movably mounted on said frame for motion to and from a container being tested.

56. The container testing apparatus of claim 54 wherein at least one of said testing heads is stationarily mounted on the frame.

57. The container testing apparatus of claim 43 further comprising detector means for selectively detecting an effect associated with application of differentially pressurized testing fluid through a leak in the container.

58. The container testing apparatus of claim 57 wherein the detector means detects a change in the wall of the container.

59. The container testing apparatus of claim 43 wherein at least one of said first and second seals is controllably expandable against a surface of the container.

60. The container testing apparatus of claim 59 wherein said second seal is controllably expandable using an internal expansion chamber; said second seal being adapted to receive a pessurizing sealing fluid within said internal expansion chamber.

61. A container testing apparatus for detecting leaks existing within a testing zone covering limited portions on surfaces of a sealed container, comprising:

a frame;

at least one testing head mounted on the frame;

first sealing means mounted on said testing head for engaging and sealing against surfaces of the container along a circuitous, continuous first seal;

second sealing means mounted on said testing head for engaging and sealing against surfaces of the container along a circuitous, continuous second seal;

said continuous first and second seals being spaced apart and defining a testing zone covering limited surface portions of the container therebetween; said first and second seals also defining at least portions of an enclosed testing fluid chamber adapted to apply a differentially pressurized testing fluid to surfaces of the container within the testing zone when said first and second sealing means are in sealing engagement against the container;

means for controllably transmitting differentially pressurized testing fluid to the testing fluid chamber when the first and second sealing means are sealingly engaged against the container surfaces;

emans for controllably transmitting differentially pressurized testing fluid from the testing fluid chamber when the first and second sealing means are sealingly engaged against the container surfaces; and detector means for selectively detecting an effect directly associated with application of the differentially pressurized testing fluid through a leak in the container.

62. The container testing apparatus of claim 61 wherein said means for controllably transmitting differentially pressurized testing fluid to the testing fluid chamber and said means for controllably transmitting differentially pressurized testing fluid from the testing fluid chamber are at least one conduit extending through the testing head.

63. The container testing apparatus of claim 62 wherein the testing zone is annular about a rim formed on a container being tested.

* * * * *